United States Patent [19]

Li et al.

[11] Patent Number: 5,717,221
[45] Date of Patent: Feb. 10, 1998

[54] MULTIPLE LASER INDICIA READER OPTIONALLY UTILIZING A CHARGE COUPLED DEVICE (CCD) DETECTOR AND OPERATING METHOD THEREFOR

[75] Inventors: Yajun Li, Oakdale; Robert A. Doran, East Setauket; John Barile, Holbrook, all of N.Y.

[73] Assignee: Symbol Technologies, Inc., Holtsville, N.Y.

[21] Appl. No.: 729,536

[22] Filed: Oct. 11, 1996

Related U.S. Application Data

[63] Continuation of Ser. No. 268,589, Jun. 30, 1994, abandoned.

[51] Int. Cl.$^6$ .................. G06K 7/10; H01J 3/16; G02B 26/10
[52] U.S. Cl. .................. 250/566; 250/568; 235/467
[58] Field of Search .................. 250/566, 568, 250/578.1, 234, 235; 235/462, 465, 467, 469, 470

[56] References Cited

U.S. PATENT DOCUMENTS

| | | | |
|---|---|---|---|
| 3,812,325 | 5/1974 | Schmidt | 235/465 |
| 4,251,798 | 2/1981 | Swartz et al. | |
| 4,369,361 | 1/1983 | Swartz et al. | |
| 4,387,297 | 6/1983 | Swartz et al. | |
| 4,387,397 | 6/1983 | Dietz | |
| 4,409,470 | 10/1983 | Shepard et al. | |
| 4,418,276 | 11/1983 | Yatsunami | |
| 4,760,248 | 7/1988 | Swartz et al. | |
| 4,794,239 | 12/1988 | Allais | |
| 4,816,661 | 3/1989 | Krichever et al. | 235/472 |
| 4,874,936 | 10/1989 | Chandler et al. | |
| 4,896,026 | 1/1990 | Krichever et al. | |
| 4,896,029 | 1/1990 | Chandler et al. | |
| 4,916,297 | 4/1990 | Tukada et al. | |
| 4,973,829 | 11/1990 | Ishida et al. | 235/462 |
| 4,998,010 | 3/1991 | Chandler et al. | |
| 5,028,770 | 7/1991 | Miyazaki et al. | 235/462 |
| 5,086,215 | 2/1992 | Carsner et al. | |
| 5,206,491 | 4/1993 | Katoh et al. | 235/467 |
| 5,210,398 | 5/1993 | Metlitsky | |
| 5,229,588 | 7/1993 | Detwiler et al. | 235/462 |
| 5,260,553 | 11/1993 | Rockstein et al. | 235/462 |
| 5,276,315 | 1/1994 | Surka | |
| 5,304,786 | 4/1994 | Pavlidis et al. | |
| 5,361,158 | 11/1994 | Tang | 235/467 |

FOREIGN PATENT DOCUMENTS

| | | |
|---|---|---|
| 0 385 478 A2 | 9/1990 | European Pat. Off. |
| 0 460 669 A2 | 12/1991 | European Pat. Off. |
| 0492065 | 7/1992 | European Pat. Off. |
| 0 569 962 A2 | 11/1993 | European Pat. Off. |
| 60-238977 | 11/1985 | Japan |
| 1-93871 | 4/1989 | Japan |
| 3-198175 | 9/1991 | Japan |
| 3-266089 | 11/1991 | Japan |

Primary Examiner—Stephone B. Allen
Attorney, Agent, or Firm—Fish & Richardson P.C.

[57] ABSTRACT

An electro-optical scanning device reads indicia having parts of different light reflectivity, including bar codes and matrix arrays such as UPSCODES. The scanning device includes laser or light emitting diodes for emitting at least two light beams of the same or different wavelengths. The light beams may be visible to the human eye, and the beams are optically directed to form one or two scan lines to scan portions of a symbol. Dual photosensor(s) or a charge coupled device detects light reflected from the different portions of the symbol. The charge coupled device can be used to detect either reflected ambient light or the reflected visible light from the beams emitted by the diodes. The photosensors generate signals corresponding to the detected light which can be processed simultaneously. The device is particularly useful in reading two dimensional or more complex symbols. Methods for reading indicia are also described.

37 Claims, 8 Drawing Sheets

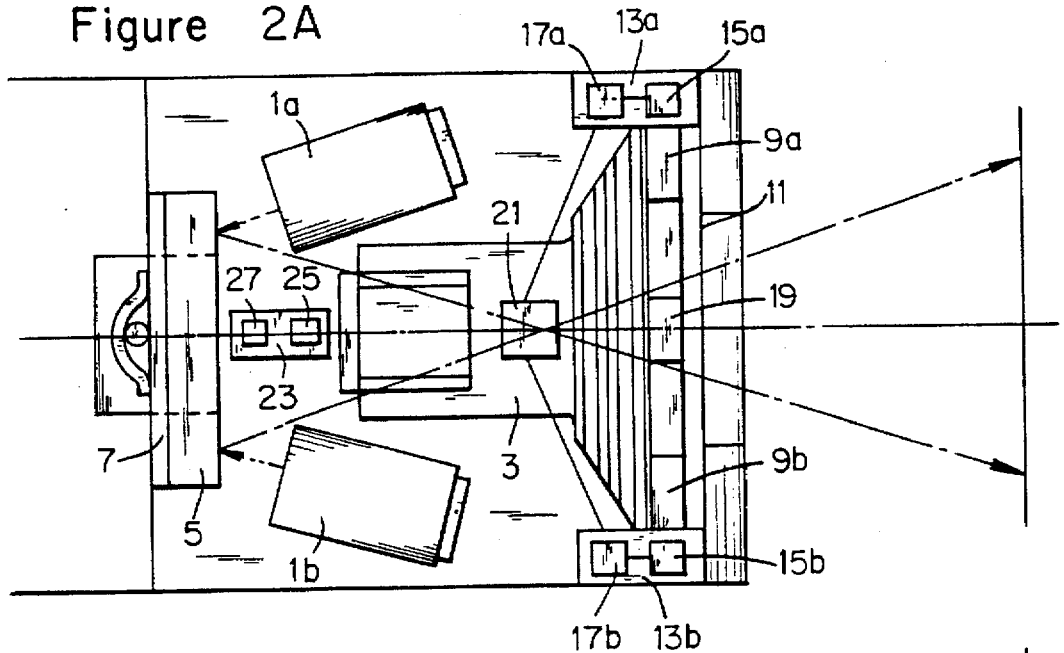
Figure 2A
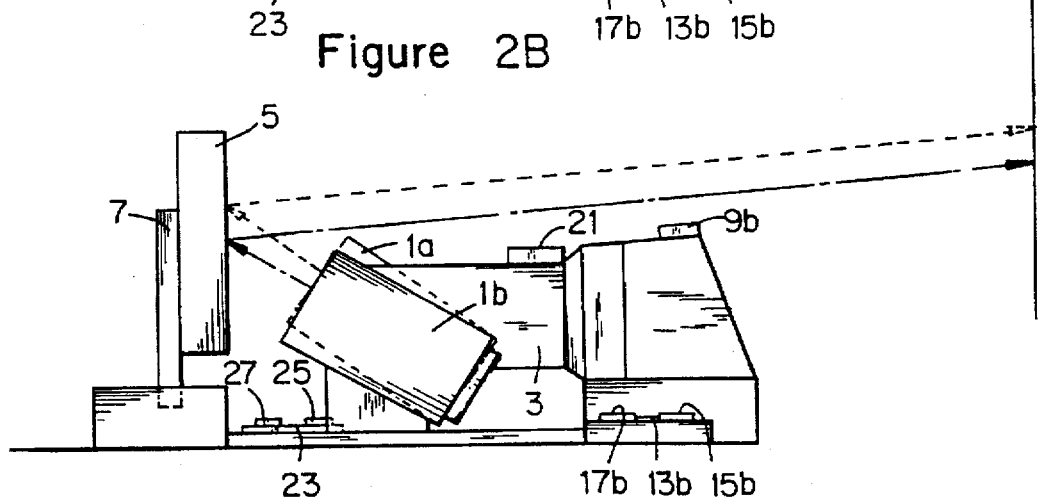
Figure 2B
Figure 2C

MULTIPLE LASER INDICIA READER OPTIONALLY UTILIZING A CHARGE COUPLED DEVICE (CCD) DETECTOR AND OPERATING METHOD THEREFOR

This is a continuation of application Ser. No. 08/268,589, filed Jun. 30, 1994, now abandoned.

REFERENCE TO RELATED APPLICATIONS

This application is related to co-pending U.S. patent application Ser. No. 08/452,995, , filed May 30, 1995 which is a divisional of Ser. No. 08/098,243, filed Jul. 29, 1993, now U.S. Pat. No. 5,420,411, which was a continuation of Ser. No. 07/717,770, filed Jun. 14, 1991, now abandoned.

This application is also related to co-pending U.S. patent application Ser. No. 08/317,775 filed Oct. 4, 1994, which is a continuation of Ser. No. 07/897,835 filed Jun. 12, 1992 now abandoned.

This application is also related to co-pending Ser. No. 08/294,438, filed Aug. 23, 1994, now abandoned, which was a continuation of Ser. No. 08/037,143, filed Mar. 25, 1993, now abandoned, (which was a Divisional application of Ser. No. 07/715,267, filed Jun. 14, 1991, now U.S. Pat. No. 5,235,167).

This application is also related to co-pending application Ser. No. 08/269,170 filed simultaneously with the filing of this application on Jun. 30, 1994, entitled "Apparatus and Method for Reading Indicia Using Charge Coupled Device and Scanning Laser Beam Technology" and a application Ser. No. 08/269,171 filed simultaneously with the filing of this application on Jun. 30, 1994, now abandoned, entitled "Tunnel Scanner with Multiple Scan Units Having Multiple Light Emitters and Optionally Utilizing a Charge Coupled Device Detector or Sensor Array" and co-pending application Ser. No. 08/268,913 filed simultaneously with the filing of this application on Jun. 30, 1994, now U.S. Pat. No. 5,621,203, entitled "Method and Apparatus for Reading Two-Dimensional Bar Code Symbols With an Elongated Laser Line".

This application is also related to co-pending U.S. patent application No. 08/098,991, filed Jul. 29, 1993, now U.S. Pat. No. 5,545,886, which is a divisional of U.S. patent application No. 07/864,367, filed Apr. 6, 1992, now U.S. Pat. No. 5,258,605, which was a continuation of U.S. patent application No. 07/493,134, filed Mar. 13, 1990, now abandoned.

BACKGROUND OF INVENTION

1. Field Of The Invention

This invention relates to electro-optical scanning devices and methods for reading indicia having different light reflectivity. More particularly, this invention relates to an electro-optical scanning device and method for reading indicia, such as bar code and matrix array symbols, using laser beam scanning technology from multiple sources and optionally also using one or more light sensors, such as a charge coupled device or array, for imaging the reflection of light off a one or two dimensional bar code or matrix array symbol or other indicia.

2. Description of the Related Art

Various optical readers and optical scanning systems have been developed heretofore for reading indicia such as bar code symbols appearing on the label or on the surface of an article. The bar code symbol itself is a coded pattern of indicia comprised of a series of bars of various widths spaced apart from one another to bound spaces of various widths, the bars and spaces having different light reflecting characteristics. The readers in scanning systems electro-optically transform the graphic indicia into electrical signals, which are decoded into alphanumeric characters that are intended to be descriptive of the article or some characteristic thereof. Such characteristics are typically represented in digital form and utilized as an input to a data processing system for applications in point-of-sale processing, inventory control and the like. Scanning systems of this general type have been disclosed, for example, in U.S. Pat. Nos. 4,251,798; 4,369,361; 4,387,297; 4,409,470; 4,760,248; 4,896,026, all of which have been assigned to the same assignee as the instant application. As disclosed in some of the above patents, one embodiment of such a scanning system resides, inter alia, in a hand held, portable laser scanning device supported by a user, which is configured to allow the user to aim the scanning head of the device, and more particularly, a light beam, at a targeted symbol to be read.

The light source in a laser scanner bar code reader is typically a gas laser or semiconductor laser. The use of semiconductor devices as the light source is especially desirable because of their small size, low cost and low voltage requirements. The laser beam is optically modified, typically by an optical assembly, to form a beam spot of a certain size at the target distance. It is preferred that the cross section of the beam spot at the target distance be approximately the same as the minimum width between regions of different light reflectivity, i.e., the bars and spaces of the symbol. At least one bar code reader has been proposed with two light sources to produce two light beams of different frequency.

The bar code symbols are formed from bars or elements typically rectangular in shape with a variety of possible widths. The specific arrangement of elements defines the character represented according to a set of rules and definitions specified by the code or "symbology" used. The relative size of the bars and spaces is determined by the type of coding used as is the actual size of the bars and spaces. The number of characters (represented by the bar code symbol) is referred to as the density of the symbol. To encode the desired sequence of the characters, a collection of element arrangements are concatenated together to form the complete bar code symbol, with each character of the message being represented by its own corresponding group of elements. In some symbologies, a unique "start" and "stop" character is used to indicate when the bar code begins and ends. A number of different bar code symbologies exist, these symbologies include UPC/EAN, Code 39, Code 128, Codeabar, and Interleaved 2 of 5 etc.

In order to increase the amount of data that can be represented or stored on a given amount of surface area, several new bar code symbologies have recently been developed. One of these new code standards, Code 49, introduces a "two dimensional" concept for stacking rows of characters vertically instead of extending the bars horizontally. That is, there are several rows of bar and space patterns, instead of only one row. The structure of Code 49 is described in U.S. Pat. No. 4,794,239, which is herein incorporated by reference. Another two-dimensional symbology, known as "PDF417", is described in U.S. patent application, Ser. No. 07/461,881, now U.S. Pat. No. 5,304,786.

Still other symbologies have been developed in which the symbol is comprised of a matrix array made up of hexagonal, square, polygonal and/or other geometric shapes. Prior art FIGS. 7A–C depict known matrix and other type symbols. Such symbols are further described in, for example, U.S. Pat. Nos. 5,276,315 and 4,794,239. Such matrix symbols may include Vericode™, Datacode™ and UPSCODE™.

In the laser beam scanning systems known in the art, the laser light beam is directed by a lens or other optical components along the light path toward a target that includes a bar code symbol on the surface. The moving-beam scanner operates by repetitively scanning the light beam in a line or series of lines across the symbol by means of motion of a scanning component, such as the light source itself or a mirror disposed in the path of the light beam. The scanning component may either sweep the beam spot across the symbol and trace a scan line across the pattern of the symbol, or scan the field of view of the scanner, or do both.

Bar code reading systems also include a sensor or photodetector which detects light reflected or scattered from the symbol. The photodetector or sensor is positioned in the scanner in an optical path so that it has a field of view which ensures the capture of a portion of the light which is reflected or scattered off the symbol is detected and converted into an electrical signal. Electronic circuitry and software decode the electrical signal into a digital representation of the data represented by the symbol that has been scanned. For example, the analog electrical signal generated by the photo detector is converted by a digitizer into a pulse or modulated digitized signal, with the widths corresponding to the physical widths of the bars and spaces. Such a digitized signal is then decoded, based on the specific symbology used by the symbol, into a binary representation of the data encoded in the symbol, and subsequently to the alpha numeric characters so represented.

The decoding process of known bar code reading system usually works in the following way. The decoder receives the pulse width modulated digitized signal from the digitizer, and an algorithm, implemented in the software, attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Such a signal is then decoded according to the specific symbology into a binary representation of the data encoded in the symbol, and to the alpha numeric characters so represented.

Moving-beam laser scanners are not the only type of optical instrument capable of reading bar code symbols. Another type of bar code reader is one which incorporates detectors based on charge coupled device (CCD) technology. In such prior art readers the sides of the detector are typically smaller than the symbol to be read because of the image reduction by the objective lens in front of the CCD. The entire symbol is flooded with light from a light source such as lighting light emitting diodes (LED) in the scanning device, and each CCD cell is sequentially read out to determine the presence of a bar or a space.

The working range of CCD bar code scanners is rather limited as compared to laser based scanners and is especially low for CCD based scanners with an LED illumination source. Other features of CCD based bar code scanners are set forth in U.S. patent application Ser. No. 08/041,281 which is hereby incorporated by reference, and in U.S. Pat. No. 5,210,398. These references are illustrative of the earlier technological techniques proposed for use in CCD type scanners to acquire and read indicia in which information is arranged in a two dimensional pattern.

It is a general object of the present invention to provide an improved indicia reader without the limitations of prior art readers.

It is a further object of the invention to provide an indicia reader which can more quickly read indicia.

It is another object of the invention to provide an indicia reader which will give a more uniform irradiance distribution.

It is yet a further object of the present invention to provide an indicia reader capable of providing an elongated scan line across indicia located close to the scanner head.

It is a still further object of the present invention to provide an indicia reader for reading two dimensional or more complex indicia.

It is yet another object of the invention to provide an indicia reader that is capable of aiming or orienting the reader and imaging the indicia.

It is still another object of the invention to automatically perform laser scanning or CCD imaging depending on the availability of ambient light.

It is also an object of the invention to provide an indicia reader capable of reading indicia of different symbology types including indicia comprised of a matrix array of geometric set shapes such as UPSCODE™.

It is an even further object of the invention to provide a method which can be used to accomplish one or more of the above objectives.

Additional objects, advantages and novel features of the present invention will become apparent to those skilled in the art from this disclosure, including the following detail description, as well as by practice of the invention. While the invention is described below with reference to preferred embodiments, it should be understood that the invention is not limited thereto. Those of ordinary skill in the art having access to the teachings herein will recognize additional applications, modifications and embodiments in other fields, which are within the scope of the invention as disclosed and claimed herein and with respect to which the invention could be of significant utility.

SUMMARY OF THE INVENTION

According to the present invention an electro-optical scanning device is provided for reading indicia, such as indicia in the form of a bar code or matrix array symbol, having parts of different light reflectivity. The scanning device has at least two light emitting devices, for example laser or light emitting diodes or both, for emitting scanning light beams, preferably in the form of visible light laser lines, of substantially equal wavelength. The light beams are directed by one or more optical devices, such as mirrors or lenses, towards portions of the targeted symbols. For example, by oscillating the emitting devices or the mirror(s), the light beams can be made to form one or more scan lines across the symbol. A detection device, such as a photo diode, is included to detect the light beams reflected by the different portions of the symbol.

According to one aspect of the above described embodiment of the present invention, a single scan line with a length of not less than five and not more than ten inches is produced when the scanning head, from which the light beams exit the scanning device, is located no more than five inches from the symbol. It is preferable for the light beams to be emitted sequentially by the emitters. That is, one light beam scans a portion of the target during a first time interval and the other light beam scans another portion of the target during a subsequent second time interval. Such sequential emission is particularly advantageous in forming a single continuous line scan across the indicia. It is also preferable to use separate optical detectors for detecting the light reflected by each portion of the symbol and generating a corresponding signal and separate processors simultaneously processing the respective signals. Each processor may include a decoder for decoding the applicable signal. In order to read symbols corresponding to more than one symbology type, each of the decoders may include a symbology discriminator for discriminating between symbols of different symbology types. The different symbology types may include a matrix array of geometric shapes, such as symbols conforming to UPSCODE™.

In accordance with a further aspect of the first embodiment of the invention, visible light beams are emitted from the emitter to form a single scan line or two offset but parallel scan lines. The single scan line is formed by focusing and synchronizing the emitted beams to effectively form a single continuous scan line. The single scan line is preferably longer than the individual emitted beams in order to provide a longer scan line across the indicia. The scanning device further includes a sensor, for example a charge coupled or similarly functioning two dimensional solid state imaging device, for sensing the symbol and generating an electrical signal representing spatial intensity variations of the symbol. The visible light being detected by the sensor may be ambient light or, alternatively, the light from the visible light beams reflected off the symbol.

The scanning device may also include, preferably as part of the sensor, a means for detecting ambient light in the field of view of the sensor and for generating an output signal if the detected ambient light is above or below a threshold value. An activation means, such as a comparator circuit and switch, can, for example, activate one or more of the light emitters in a controlled response to the output signal.

In a second embodiment of the invention, the electro-optical scanning device is similar to that described above; however, the light emitting or laser diodes emit light beams of different wavelengths. This embodiment is particularly suitable for reading different code types.

In this embodiment it is preferred, although not required, that each light beam be directed towards a different portion of the targeted symbol by a separate mirror or other optical device. It is also considered preferable, although once again not mandatory, that the mirrors rather than the emitters be oscillated such that each light beam forms a separate scan line across the target symbol. Separate detectors, such as photo diodes, detect light from each of the light beams reflected by the symbol and generate a signal corresponding to the detected light. A processor is provided for individually and simultaneously processing the respective signals. As in the first embodiment, the light beams are preferably simultaneously emitted from the light emitting devices. The scanning device in accordance with this embodiment will normally include multiple filters for filtering the light reflected off the symbol and multiple lenses or other means for focusing the filtered light toward a corresponding detector. The processor may include separate decoders for decoding a digitized signal corresponding to the signal generated by one of the detectors and an assembler for assembling a common matrix corresponding to the decoded signals. The decoder may also have a symbology discriminator similar to that described above with reference to the first embodiment of the invention.

In accordance with a third embodiment of the invention, an electro-optical scanning device is provided which is particularly suitable for reading two dimensional or more complex symbols. At least two light emitting sources, such as light emitting or laser diodes, are used to emit visible light beams, preferably scanning laser lines. For example, the visible light beams can be reflected off one or more mirrors or other optical device to scan and illuminate different portions of the symbol. An oscillating means, such as a electric motor or electro-magnet device, can be used to oscillate the emitters or mirrors so that an appropriate set of scan lines are formed across the symbol. A sensor, detects a reflection of visible light from the symbol and generates a representative electrical signal.

According to one aspect of this third embodiment of the invention, when the scanning head, from which the visible light beams exit the scanning device, is disposed no more than five inches from the symbol, the light beams form a scan line having a length of not less than five and not more than ten inches. However, it should be noted that the third embodiment is not limited to such close range applications.

The visible light detected by the sensor may be the reflected visible light from the visible light beams or, in the case of a CCD detector, the reflection of ambient light from the symbol. In the latter case, the emitted light beams can be used to properly aim the scanning device rather than read the symbol.

According to other aspects of the third embodiment of the invention, the scanning device may also include a processor for processing the electrical signal generated by the sensor. The processor preferably includes a decoder for decoding a digitized signal corresponding to the electrical signal. The decoder may include a symbology discriminator for discriminating between symbols of different symbology types.

In accordance with still further aspects of the third embodiment of the present invention, a single scan line is formed by the emitted visible light beams. The single scan line is formed by focusing and synchronizing the emitted light beams to effectively form a single continuous scan line which is longer than the individual emitted light beams and thus able to provide a longer scan line across the indicia. Alternatively, the visible light beams can form offset but parallel scan lines. This alternative is particularly suitable for two dimensional symbols with indicia arranged in rows or a matrix array such that the symbol may be characterized as having upper and lower portions. With such two dimensional symbols, one visible light beam forms a scan line across the upper portion of the symbol and another visible light beam simultaneously forms a different scan line across the lower portion of the symbol. The scanning device in accordance with the third embodiment of the invention may also include a photodetector(s), such as photodiodes, for detecting the reflection off the symbol of light from the beams. In such a configuration, the sensor and photodetector(s) can be selectively and alternatively utilized depending on the available ambient light and/or the distance from the targeted symbol. An ambient light detector and activator like that described above may also be provided.

If an ambient light detector is provided, the output signal may also be used to adjust the photosensor by adjusting an aperture on the photosensor or the gain in the processing circuitry, i.e., the amplification of the signal during processing.

According to the method of the present invention, indicia having parts of different light reflectivity are electro-optically read by emitting a first and second light beam. The beams are respectively directed toward a first portion and second portion of the indicia to form at least one scan line across the indicia. Light reflected by the first portion of the indicia and light reflected by the second portion of the indicia is detected.

In accordance with another method of the present invention for electro-optically reading indicia having parts of different light reflectivity, first and second light beams having different wavelengths are emitted. The first light beam is directed towards a first portion of the indicia and the second light beam towards a second portion of the indicia, so as to form first and second scan lines across said indicia. A first signal is generated corresponding to detected light reflected from the first portion of the indicia. A second signal is generated corresponding to detected light and reflected from the second portion of the indicia. The first and second signals are processed simultaneously. The light reflected from the indicia is preferably filtered and focussed said prior to detection. Preferably, the focussed light reflected from the first portion of the indicia is separately detected from that reflected from the second portion of the indicia.

A still further method for electro-optically reading indicia having parts of different light reflectivity includes emitting first and second visible light beams. The first visible light beam is directed to illuminate a first portion of the indicia, and the second visible light beam is directed to illuminate a second portion of the indicia, such that said first and second visible light beams form at least one scan line across the indicia; and The reflection of visible light from the indicia is detected and an electrical signal representing spatial intensity variations of the indicia generated.

With respect to one or more of the methods described above, it may be preferable, for the first and second light beams to be emitted in a sequence or simultaneously. It may also, with respect to certain of the described methods, be beneficial for a first signal to be generated corresponding to the detected light from the first portion of the indicia and a second signal generated corresponding to the reflected light from the second portion of the indicia. Beneficially, the first and second signals are processed and decoded simultaneously. The decoding may include discriminating between indicia of different symbology types. The indicia may include a matrix array of geometric shapes. A symbol conforming to UPSCODE™ symbology may be read using the described methods.

In accordance with certain aspects of the methods, the first and second light beams can be visible light expanded beams or laser lines. A single scan line or dual scan lines may be formed. The indicia can be sensed and an electrical signal generated corresponding to visible light reflected from the indicia. The reflected visible light may be ambient light or the visible light from the first and second light beams. It may be beneficial to detect an ambient light level in a field of view and generate an output signal if the detected ambient light is above a threshold value, in response to which the first and second light beams are emitted.

BRIEF DESCRIPTION OF THE DRAWINGS

FIGS. 2A–2C are respectively a plan and two elevation views of the electro-optical scanning device of FIG. 1.

DESCRIPTION OF THE PREFERRED EMBODIMENT

Figure 1:
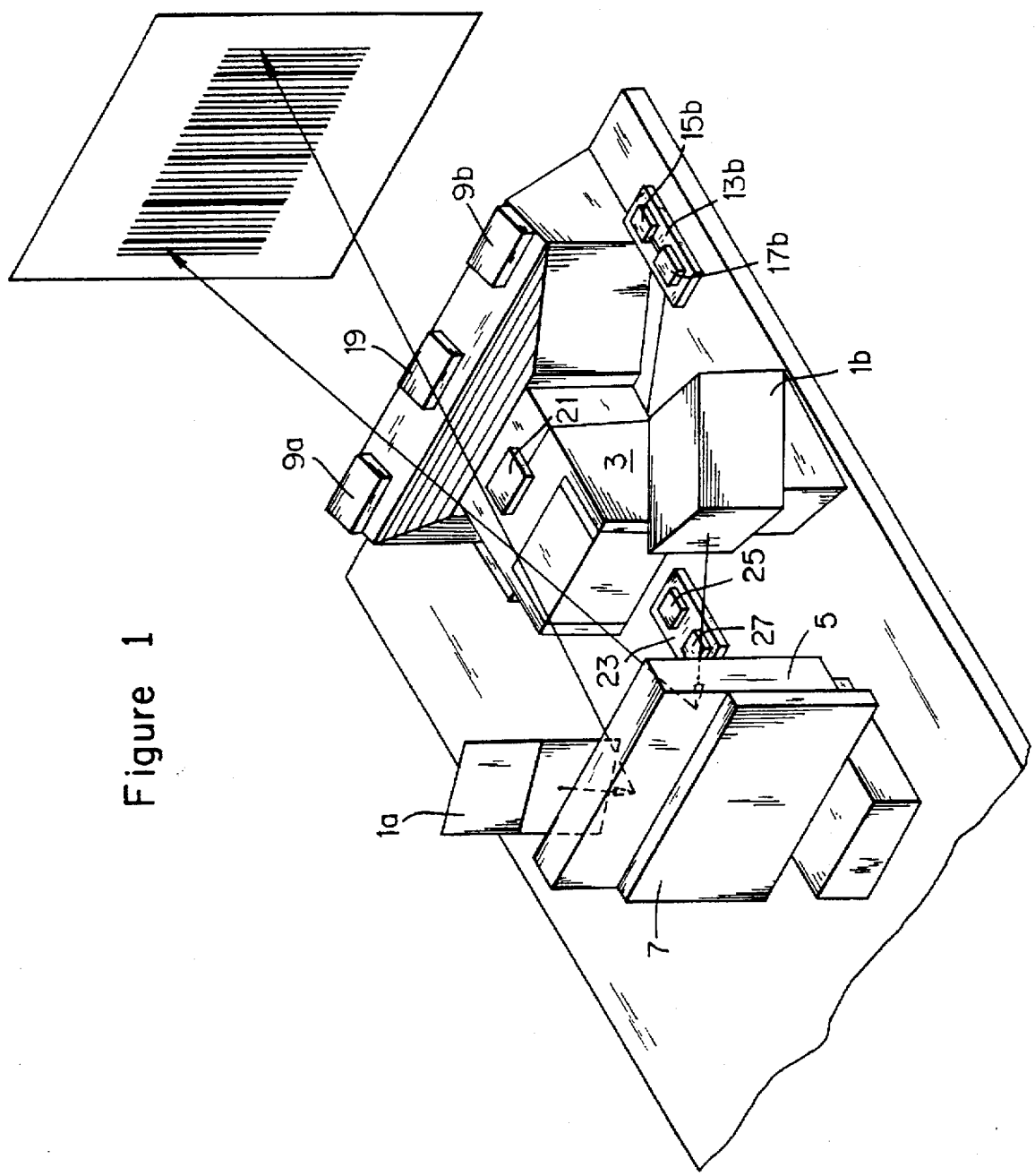
FIG. 1 is a prospective view of an electro-optical scanning device in accordance with the present invention.

FIGS. 1, 2A, 2B and 2C are representative multiple laser scanners in accordance with the present invention. In the FIGS. 1, 2A and 2B embodiment, each of scan line generators 1a and 1b generates a light beam in the form of a scan line. The scan line generators 1a and 1b are preferably either laser or light emitting diodes which generate laser lines or flying spot light scans. Such scan lines are sometimes referred to as expanded light beams in the art. A mirror 5, which is preferably a single large mirror, is oscillated by oscillator 7. The oscillator 7 may include a wide-band scanner motor of the type described in U.S. Pat. No. 4,387, 397. The oscillator 7 includes a shaft and bracket for mounting the mirror 5. The scan line generators 1a and 1b are arranged such that the scan line generated by scan line generator 1a is reflected off oscillating mirror 7 and scans across one portion of the targeted symbol, and the scan line generated by scan line generator 1b is reflected off oscillating mirror 7 and scans across another portion of the targeted symbol. Preferably, the scan lines are sequentially generated by scan line generators 1a and 1b. The emissions are timed so that the scan line from scan line generator 1a is first emitted for a predetermined time period to scan one portion of the symbol. The light source in scan line generator 1a is deactivated at the expiration of the predetermined time period. Simultaneous with or shortly after the deactivation of the generator 1a light source, the light source of generation 1b is activated for a predetermined time period. Thus, the scan line from generator 1b is then emitted to scan another portion of the symbol.

Figure 3:
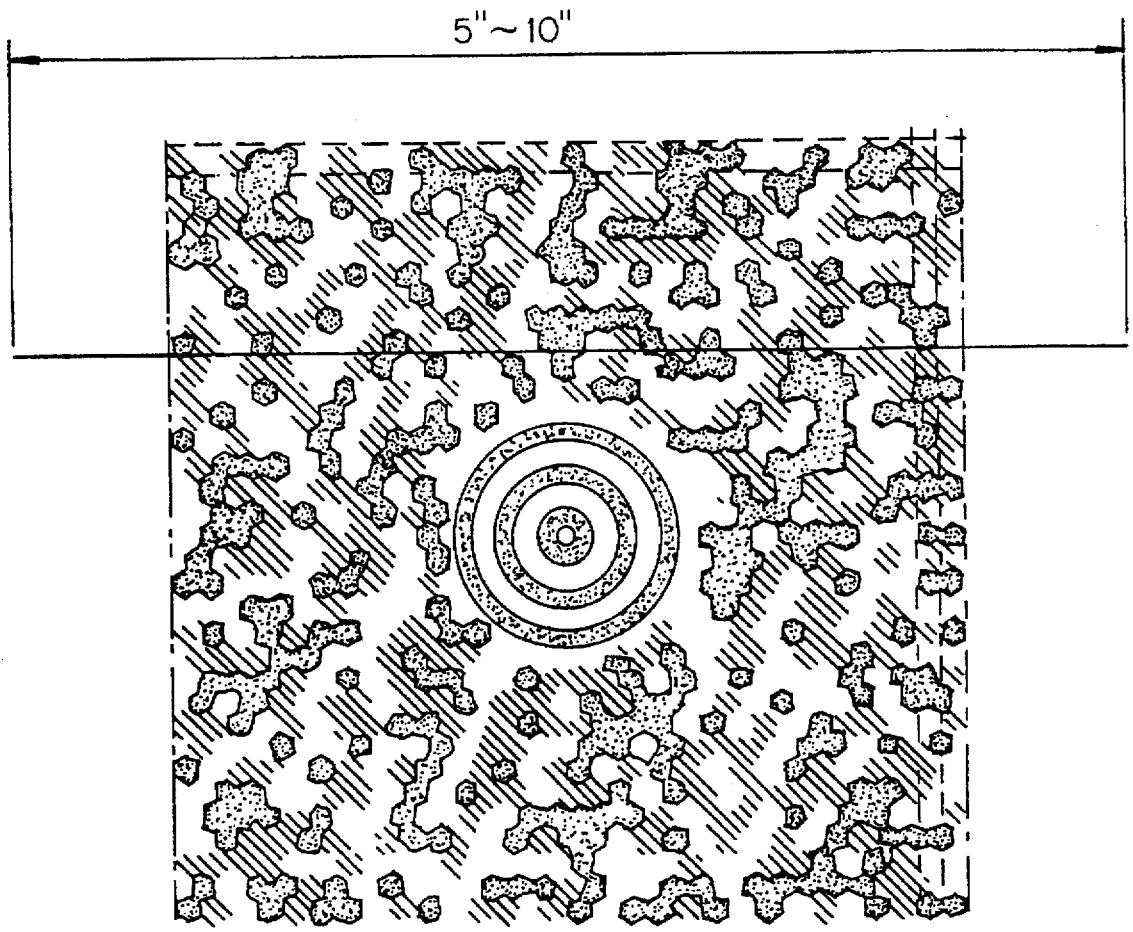
FIG. 3 depicts a single scan line produced by the FIGS. 2A and 2B scanners.

The two scan lines reflected off the mirror are focussed and synchronized to effectively form a single continuous line scan across the width of the targeted bar code as shown in FIG. 3. The beams are focused so as to be generally aligned with a relatively slight overlap and offset. The overlap and offset are set, as will be clear to those skilled in the art, so as to optimize the uniformity of the intensity distribution of the illumination or irradiation of the single line scan.

Additionally, by utilizing multiple scan line generators and joining the scan lines generated by them to form the single line scan, the length of the single line scan can be increased. With the scan line generators arranged as shown, a single line scan in the range of 5 to 10 inches can be obtained with the scanner's scanning head within 5 inches of the target bar code. However, the scanner is not necessarily limited to such close range uses. Photosensors 9a and 9b respectively detect the reflection off the targeted bar codes of the light emitted by scan line generators 1a and 1b.

Although dual photosensors are shown, it may be possible, in some cases, to use a single photosensor to detect the reflected light from both beams. Photosensors 9a and 9b generate an electrical signal corresponding to the detected reflected light from the respective field of view. The electrical signal is then processed in processors 13a and 13b respectively using decoders 15a and 15b as is well understood in the art. The processing may also be performed simultaneously to increase the speed of the scanner. Each processor also includes a symbol discriminator 17a and 17b to determine the symbology type of the targeted symbol in order to facilitate proper decoding. The symbol discriminator could, for example, be implemented using a comparator circuit or other conventional means.

In the hybrid laser/CCD scanner of the present invention, visible light scans are produced by the scan line generators 1a and 1b and a charge coupled device (CCD) 3 is included in the scanner. The flying spot light scans are advantageously employed to read linear bar codes or stacked linear bar codes, while the CCD imager is advantageously employed to read a matrix code. The CCD shown is a linear array having, for example, 1024 pixels. Another type of solid state imaging device could be used in lieu of the CCD if desired. The CCD images the targeted symbol, and when activated, generates an electrical signal representing visible light reflected from a path in the field of view. The scanner beneficially includes an ambient light detector 19 to detect the ambient light in the field of view of the CCD. An output signal is generated if the detected ambient light meets the necessary threshold to get a satisfactory read from the CCD. If the threshold is met, the output signal causes the activator 21 to activate the CCD. The scan line may be used to provide an aiming beam to allow the user to point and orient the reader at the target symbol, and to ensure that the symbol is within the CCD's active area of detection. Preferably, the laser line scanning will occur only on an intermittent basis to allow the CCD to image the symbol without interference from the reflected aiming laser light beam.

Alternatively, an output signal can be generated only if the threshold is not met. In this case activator 21 activates the scan line generators 1a and 1b. The light reflected off the symbol is detected by the photosensors 9a and 9b and processed as discussed above. The ambient light detector 19 and activation means 21 are unnecessary or used to activate generator 1a and 1b when there is insufficient ambient light, if the CCD 3 is of a type which reads the visible light from the visible light beam which is reflected off the symbol.

In still further alternatives, the output signal generated by the ambient light detector can also be used to adjust an aperture on the CCD or the gain of the processing circuitry to facilitate the attaining of a satisfactory read.

The CCD 3 after detecting the reflective visible light generates an electrical signal corresponding to the target symbol. The electrical signal is processed in the conventional fashion, as discussed above, in processor 23 which includes a decoder 25 and symbol discriminator 27.

Figure 4:
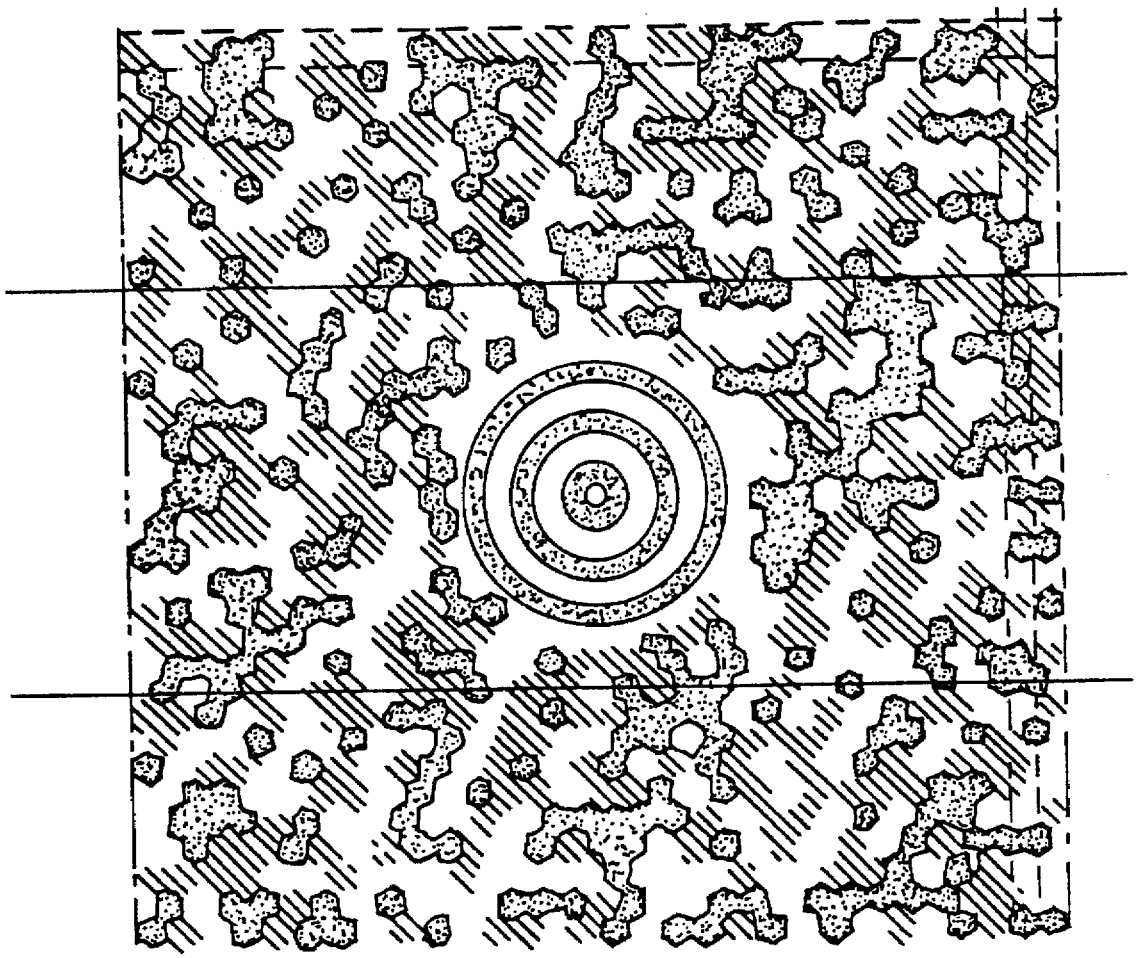
FIG. 4 depicts dual scan lines produced by the FIGS. 2A and 2C scanners.
Figure 5:
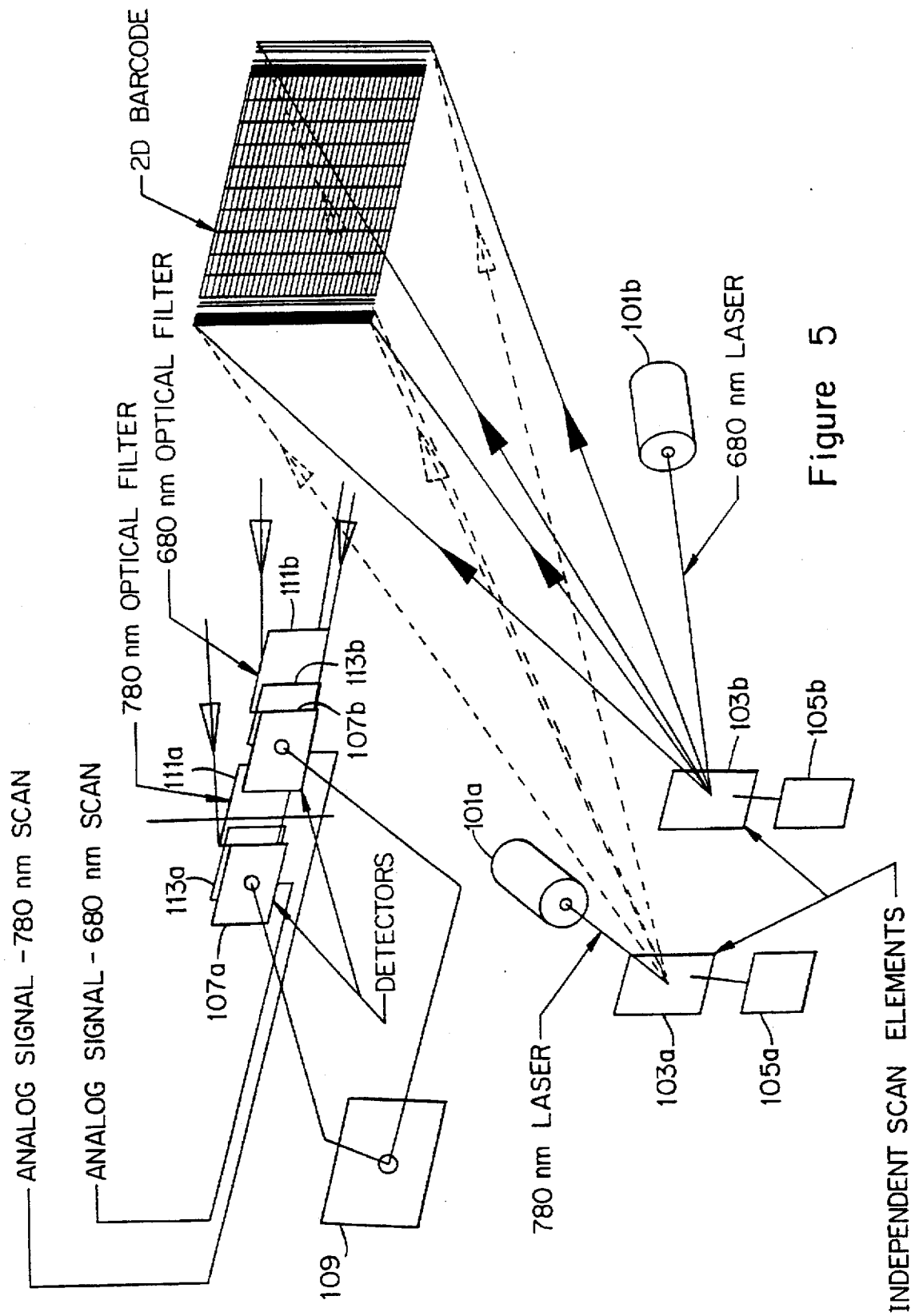
FIG. 5 is a schematic depiction of the interrelationship of a multiple wavelength dual laser scanner in accordance with the present invention.

As shown in FIG. 4, rather than a single scan line the scan line generators 1a and 1b can be arranged to provide parallel but offset scan lines which can be used beneficially for targeting and reading either two-dimensional bar code or matrix array symbols. Elevation view 2C shows an orientation of the scan line generators 1a and 1b which will provide the dual offset scan lines of FIG. 4. As shown, scan line generator is angularly displaced from scan line generator 1b. It may be, in certain situations, preferable to use dual oscillating mirrors as shown in FIG. 5 if a synchronous dual offset scan lines are desired. Although various embodiments of the invention are described in terms of scan lines, it should be understood that raster or other type scan patterns could be utilized by oscillating the mirror(s) as is well known in the art.

Figure 7A:
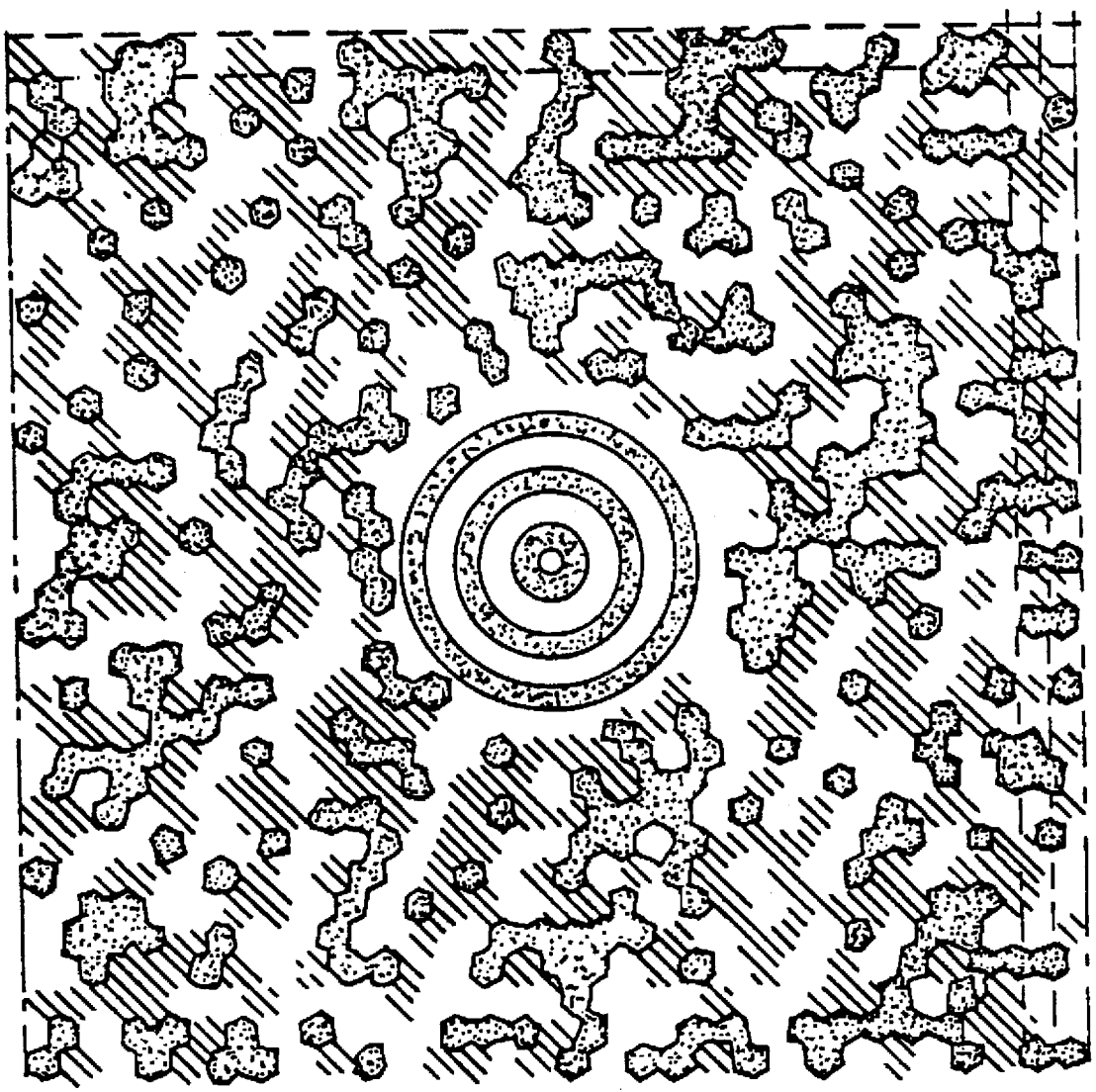
FIGS. 7A–7C depict symbols conforming to conventional matrix array and other symbologies.
Figure 7B:
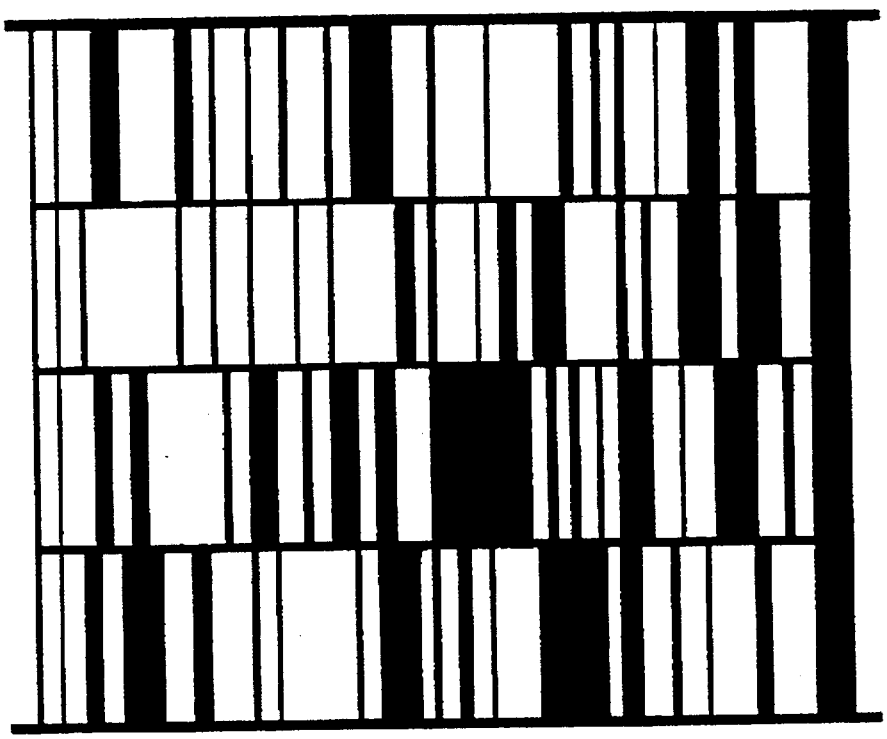
Figure 7C:
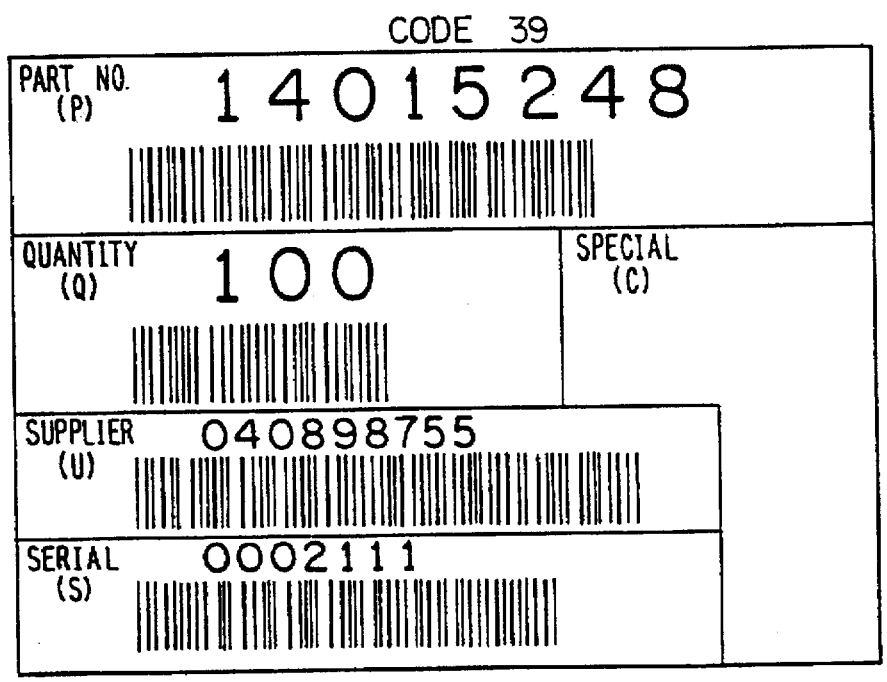

FIG. 5 depicts a further embodiment of the invention using dual laser beams having different wavelengths. This configuration is particularly suitable for, but not limited to, reading two dimensional bar code or matrix array symbols such as those shown in FIG. 7A. Laser diodes 101a and 101b simultaneously emit light beams which are reflected respectively off mirrors 103a and 103b towards different portions of the target symbol. The mirrors 103a and 103b can be oscillated in any number of conventional ways. As shown, in one possible implementation, electrical motors 105a and 105b, with flexural elements and brackets to affix to the mirrors are utilized to provide a rastering motion to the mirrors to produce scan lines across the targeted symbol. Because of different wavelengths of the light beams, the light reflected off the symbol is first filtered in conventional optical filters 111a and 111b. The filtered light is focused respectively by focusing devices 113a and 113b onto photo sensors 107a and 107b. Focusing means 113a and 113b can be any number of conventional lens arrangements. The light beams produced by laser diodes 101a and 101b may be reflected off different portions of the symbol to increase the speed at which the symbol can be scanned. Alternatively, both light beams may scan the same portions or the entire symbol to improve reading ability.

Figure 6:
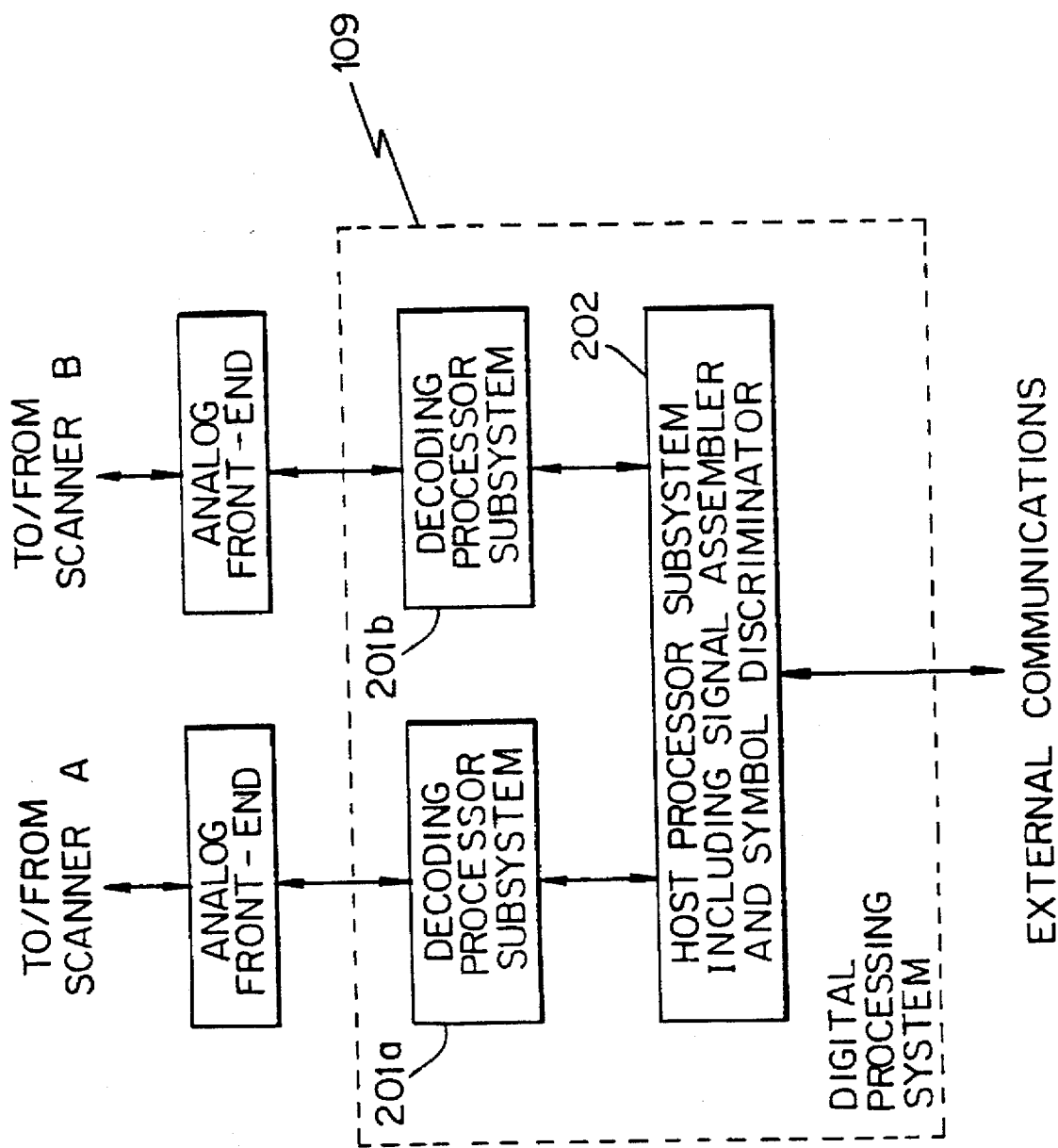
FIG. 6 is a block diagram of the processor of the FIG. 6 scanner.

As shown in the block diagram of FIG. 6, the analog signals generated by the photosensors 107a and 107b after detection of the laser light beams are simultaneously decoded in the decoding processor subsystems 201a and 201b of processor 109. The host processor subsystem 202 includes a signal assembler and symbol discriminator. The symbol discriminator is similar to that described above. The signal assembler assembles a common matrix corresponding to the decoded signals corresponding to the detected light. The host processing subsystem 202 can be implemented in various ways which are well known in the art using either hardware and/or software implementations. The digital processing system of FIG. 6 can be a basic parallel, multi-processing architecture with a host processor monitoring the system activities as well as performing, among other things, matrix operations and error correction for PDF417 sessions. Each optical scan assembly/analog front-end has a dedicated processor subsystem behind it that pre-conditions the raw data and transfers the partially processed information independently to the host processor. The host completes the decoding. The shared processing load provides fast decode times for 2-D and matrix array symbols. Bidirectional communications between all the processing entities and the optical scan assemblies permits adaptive control of the scanner laser patterns for optimal decode speed as well as data communications with remote systems. Standard 1-D symbol decoding can also be supported and the system is scalable to any number of scanners.

Although the various embodiments of the invention have been discussed without reference to the scanner housing, triggering mechanism and other features of conventional scanners, it will be understood that a variety of housing styles and shapes and triggering mechanisms could be used. Other conventional features can also be included if so desired. The invention is directed primarily to a portable hand-held scanning device and thus is preferably implemented using miniaturized components such as those described in the materials referenced herein, or otherwise known in the art. However, the scanner of the present invention is not limited to use in portable devices and can also be easily adapted for use in a stationary housing wherein the item on which the symbol resides is moved across the scanner head.

Additionally, even though the present invention has been described with respect to reading one or two dimensional bar code and matrix array symbols, it is not limited to such embodiments, but may also be applicable to more complex indicia scanning or data acquisition applications. It is conceivable that the present invention may also find application for use with various machine vision or optical character recognition applications in which information is derived from indicia such as printed characters or symbols, or from the surface or configurational characteristics of the article being scanned.

In all of the various embodiments, the elements of the scanner may be implemented in a very compact assembly or package such as a single printed circuit board or integral module. Such a board or module can interchangeably be used as the dedicated scanning element for a variety of different operating modalities and types of data acquisition systems. For example, the module may be alternately used in a hand-held manner, a table top scanner attached to a flexible arm or mounting extending over the surface of the table or attached to the underside of the table top, or mounted as a subcomponent or subassembly of a more sophisticated data acquisition system.

Each of these different implementations is associated with a different modality of reading bar code or other symbols. Thus, for example, the hand-held scanner is typically operated by the user "aiming" the scanner at the target; the table top scanner operated while the target is moved rapidly through the scan field, or "presented" to a scan pattern which is imaged on a background surface. Still other modalities within the scope of the present invention envision the articles being moved past a plurality of scan modules oriented in different directions so at least the field of view allows one scan of a symbol which may be arbitrarily positioned on the article.

The module would advantageously comprise an optics subassembly mounted on a support, and a photodetector component. Control or data lines associated with such components may be connected to an electrical connector mounted on the edge or external surface of the module to enable the module to be electrically connected to a mating connector associated with other elements of the data acquisition system.

An individual module may have specific scanning or decoding characteristics associated with it, e.g. operability at a certain working distance, or operability with one or more specific symbologies or printing densities. The characteristics may also be defined through the manual setting of control switches associated with the module. The user may also adapt the data acquisition system to scan different types of articles or the system may be adapted for different applications by interchanging modules in the data acquisition system through the use of a simple electrical connector.

The scanning module described above may also be implemented within a self-contained data acquisition system including one or more such components as keyboard, display, printer, data storage, application software, and data bases. Such a system may also include a communications interface to permit the data acquisition system to communicate with other components of a local or wide area network or with the telephone exchange network, either through a modem or an ISDN interface, or by low power radio broadcast, or other types of wireless communication, from a portable terminal to a stationary or mobile receiver.

It will be understood that each of the features described above, or two or more together, may find a useful application in other types of scanners and readers differing from the types described above.

As described above, an improved reader is provided with dual light emitters of the same or different wavelength for reading indicia of different symbology type. The described scanner can provide an elongated scan even with the scanner head located close to the targeted symbol. A scanner is provided which combines the features of multiple scanner readers and CCD readers into a single unit for reading one or two dimensional or more complex symbols. The reader utilizes multiple scanning beams for aiming or orientation and solid state imaging for reading the targeted symbol. The described reader can also automatically perform either dual scanning or CCD imaging, depending on the availability of ambient light.

What is claimed:

1. A method for electro-optically reading indicia having parts of different light reflectivity, the method comprising:
   emitting a first light beam toward the indicia to produce a first scan line across a first portion of the indicia;
   emitting a second light beam toward the indicia to produce a second scan line across a second portion of the indicia;
   directing the first and second light beams so that said first and second scan lines overlap along the scan direction to produce a substantially continuous scan line longer than either of the first and second scan lines;
   shaping the first and second light beams so that they have substantially the same working range; and
   detecting light reflected by the indicia from the first and the second light beams.

2. A method for electro-optically reading indicia according to claim 1, wherein said indicia includes a matrix array of geometric shapes.

3. A method for electro-optically reading indicia according to claim 1, wherein said indicia includes a symbol conforming to UPSCODE™ symbology.

4. The method of claim 1 wherein the first and second scan lines are arranged substantially end to end.

5. The method of claim 1 wherein the scan lines also overlap in a direction perpendicular to the scan direction.

6. The method of claim 1 wherein the first and second light beams are generated sequentially.

7. The method of claim 1 wherein the first and second light beams are generated substantially simultaneously.

8. A method for electro-optically reading indicia according to claim 1, wherein said first and second light beams are visible light laser lines which are focused and synchronized to form a single scan line, and further comprising imaging light reflected from said indicia and generating an electrical signal representing spatial intensity variations of said indicia.

9. A method for electro-optically reading indicia according to claim 8, wherein said imaged reflected light is ambient light.

10. A method for electro-optically reading indicia according to claim 8, wherein said imaged reflected light is from the first and second light beams.

11. A method for electro-optically reading indicia according to claim 8, further comprising detecting an ambient light level in the field of view and generating an output signal if an attribute of said detected ambient light level is above a threshold value.

12. A method for electro-optically reading indicia according to claim 11, further comprising emitting at least one of said first and second light beams in a controlled response to said generated output signal.

13. A method for electro-optically reading indicia according to claim 11, wherein said imaging is adjusted for said ambient light level in response to said generated output signal.

14. A method for electro-optically reading indicia according to claim 11, further comprising processing said electrical signal, wherein said processing includes amplification of signals during processing and said amplification is adjusted for said ambient light level in response to said generated output signal.

15. A method for electro-optically reading indicia according to claim 1, wherein said first and second light beams are emitted sequentially.

16. An electro-optical scanning device for producing a scanning beam for electro-optically reading indicia having parts of different light reflectivity, the device comprising:

first light emitting means for emitting a first light beam toward the indicia to produce a first scan line across the indicia;

second light emitting means for emitting a second light beam toward the indicia to produce a second scan line across the indicia;

means for directing the first and second light beams so that said first and second scan lines overlap along the scan direction to produce a substantially continuous scan line longer than either of the first and second scan lines;

means for shaping the first and second light beams so that they have substantially the same working range; and detection means for detecting light reflected by the indicia from the first and the second light beams.

17. An electro-optical scanning device according to claim 16, further comprising a scanning head from which said first and second light beams exit said scanning device and wherein said at least one scan line is a single scan line with a length of not less than five and not more than ten inches when said scanning head is disposed no more than five inches from said indicia.

18. An electro-optical scanning device according to claim 16, wherein said first and second light emitting means emit said first and second light beams in a sequence.

19. An electro-optical scanning device according to claim 16, wherein said first and second light emitting means include laser diodes.

20. An electro-optical scanning device according to claim 16, wherein said indicia includes a symbol having a region of reduced light reflectively formed from one or more shapes aligned in a row parallel to an axis, and said at least one scan line is a single scan line formed by focusing and synchronizing said first and second light beams to effectively form a single continuous scan line with an elgonated dimension (i) greater than an elongated dimension of each of said first light beam and said second light beam and (ii) parallel to said axis.

21. An electro-optical scanning device according to claim 16, wherein said first and second light beams are visible light laser lines and said at least one scan line is a single scan line, and further comprising sensor means for imaging light reflected from said indicia and for generating an electrical signal representing spatial intensity variations of said indicia.

22. An electro-optical scanning device according to claim 16, wherein said detection means detects light reflected from a third portion of the indicia which is in the form of a bull's eye mark.

23. An electro-optical scanning device according to claim 16, wherein each said light emitting means includes a laser diode array.

24. An electro-optical scanning device according to claim 16, further comprising sensor means for imaging light reflected from said indicia and for generating an electrical signal representing spatial intensity variations of said indicia; and wherein said first and second light beams are visible light laser lines, and said at least one scan line is comprised of two scan lines which are offset from and parallel to each other.

25. The method of claim 16 wherein the first and second scan lines are arranged substantially end to end.

26. An electro-optical scanning device according to claim 16, wherein said detection means includes a first optical detector for detecting said reflected light from said first portion of said indicia and generating a first signal corresponding to said detected light and a second optical detector for detecting said reflected light from said second portion of said indicia and generating second signal corresponding to said detected light.

27. An electro-optical scanning device according to claim 26, wherein each of said first and second processing means has a decoder for decoding digitized signals corresponding to said first and second signals, and symbology discrimination means for discriminating between indicia of different symbology types.

28. An electro-optical scanning device according to claim 27, wherein one of said symbology types includes a matrix array of geometric shapes.

29. An electro-optical scanning device according to claim 27, wherein one of said symbology types is UPSCODE™.

30. An electro-optical scanning device according to claim 16, further comprising sensor means for imaging light reflected from said indicia and generating an electrical signal representing spatial intensity variations of said indicia.

31. An electro-optical scanning device according to claim 30, wherein said imaged reflected light is ambient light.

32. An electro-optical scanning device according to claim 30, wherein said imaged reflected light is from the first and second light beams.

33. An electro-optical scanning device according to claim 30, wherein said sensor means is a charge coupled device.

34. An electro-optical scanning device according to claim 30, wherein said sensor means is a two dimensional solid state imaging device.

35. An electro-optical scanning device according to claim 30, wherein said sensor means includes means for detecting ambient light in the field of view of said sensor means and for generating an output signal if an attribute of said detected ambient light is above a threshold value.

36. An electro-optical scanning device according to claim 35, further comprising activation means for activating at least one of said first and second light emitting means in a controlled response to said generated output signal.

37. An electro-optical scanning device according to claim 30, wherein said sensor means detects light reflected from a third portion of the indicia which is in the form of a bull's eye mark.

* * * * *

UNITED STATES PATENT AND TRADEMARK OFFICE
CERTIFICATE OF CORRECTION

PATENT NO. : 5,717,221

DATED : February 10, 1998

INVENTOR(S) : Yajun Li, Robert A. Doran, and John Barile

It is certified that error appears in the above-identified patent and that said Letters Patent is hereby corrected as shown below:

Column 5, line 10, delete "separate", and after "processors", insert --and--.

Column 6, line 11, "a" should be --an--.

Column 7, line 30, "The" should be --the--.

Column 8, lines 36 and 37, "generation" should be --generator--.

Signed and Sealed this

Twenty-seventh Day of October, 1998

Attest:

BRUCE LEHMAN

*Attesting Officer*    *Commissioner of Patents and Trademarks*